Dec. 17, 1929.  O. CULLMAN  1,739,826
ELECTRIC LOW SPEED UNIT
Filed Jan. 21, 1928    2 Sheets-Sheet 1
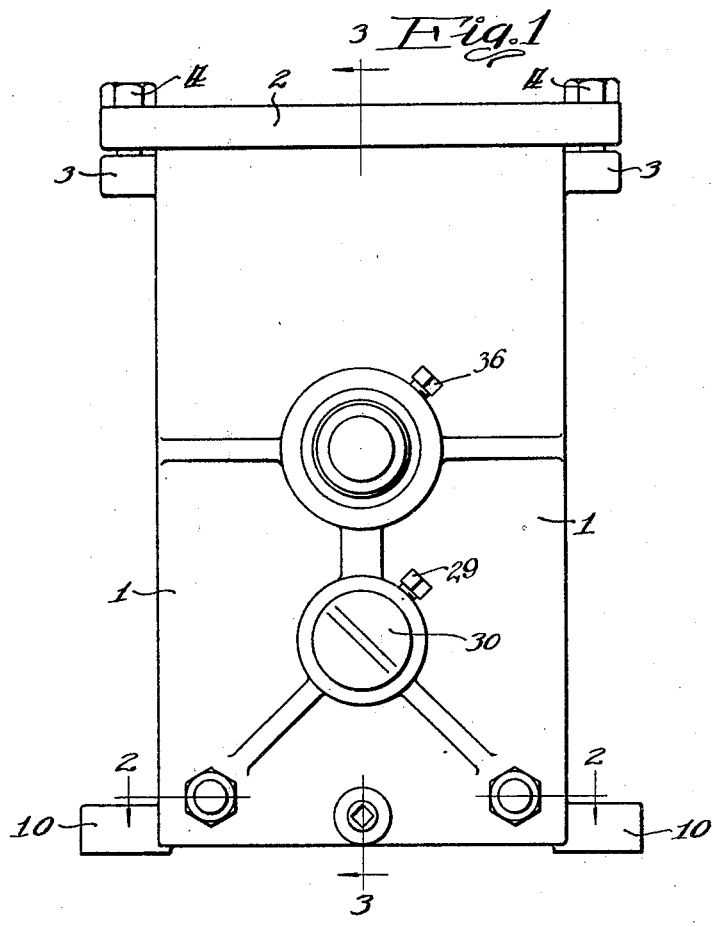
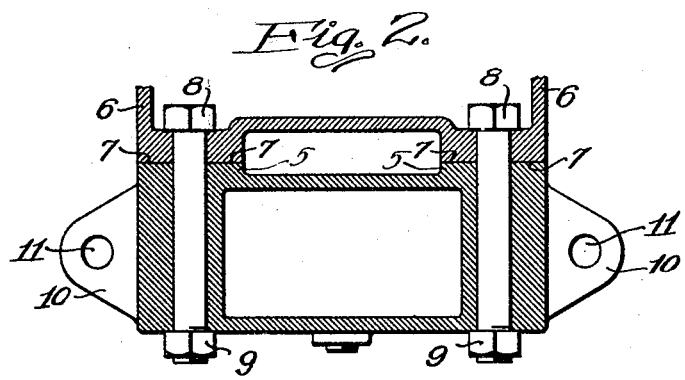
Inventor:
Otto Cullman
By Charles Turner Brown

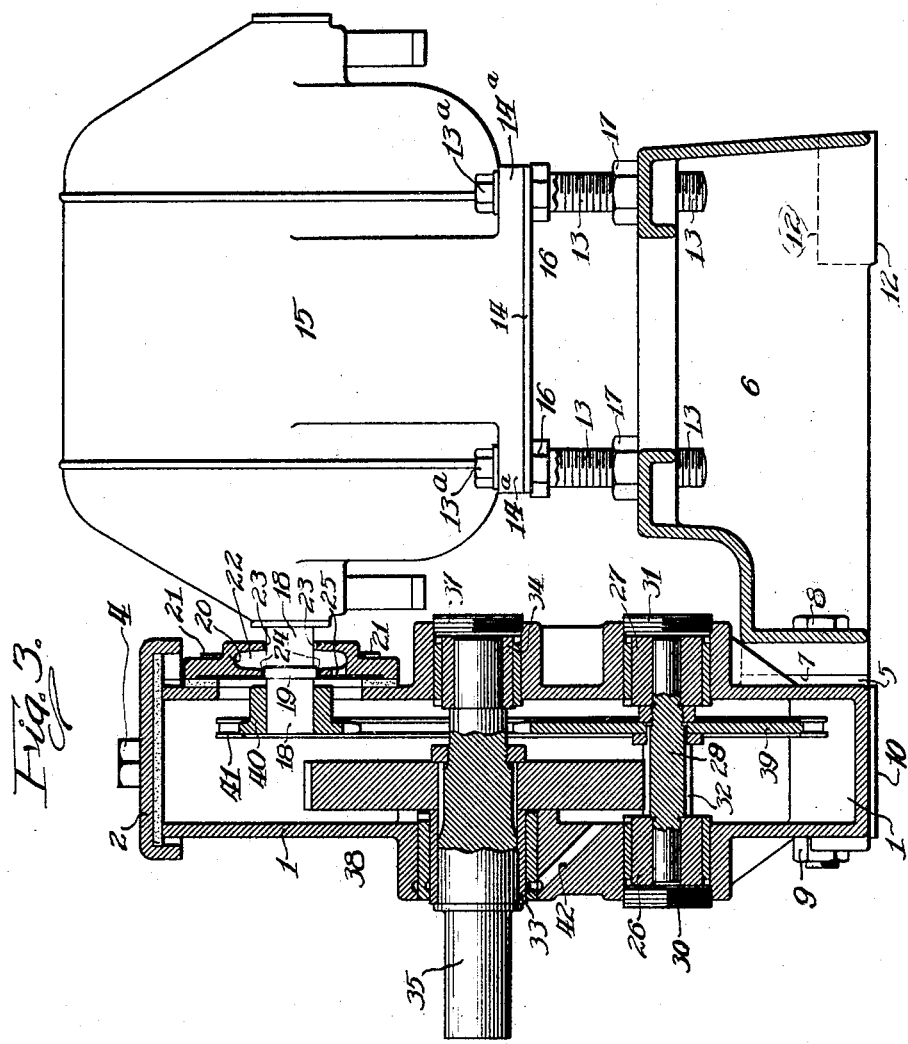

Patented Dec. 17, 1929

1,739,826

UNITED STATES PATENT OFFICE

OTTO CULLMAN, OF CHICAGO, ILLINOIS

ELECTRIC LOW-SPEED UNIT

Application filed January 21, 1928. Serial No. 248,349.

This invention relates to a device to reduce or step down the high speed of electric motors to a speed adapted to run a determined machine, or for special purposes.

Among the objects of the invention is to obtain an efficient, durable and compact low speed unit which can be placed on and secured to any suitable substantially horizontal surface, as a floor, a metal plate, or on a platform. An additional object is to obtain an electric low speed unit adapted to be associated with an electric motor in such manner as to permit adjustment between the unit and the motor. A further object is to obtain an electric low speed unit in which all the gears, sprockets, chains and bearings will be automatically oiled, so long as a determined quantity of oil is contained in the housing of the device, and at the same time no oil will be lost or conveyed outside said housing. A still further object is to obtain an electric low speed unit in which the housing of the reducing means will be rigidly secured to the base of the motor supporting member to permit the securing of the entire construction on other than a horizontal table, without derangement of the relative position of the housing of the reducing means and the motor supporting member.

I have illustrated an electric low speed unit embodying this invention in the drawings referred to, in which Fig. 1 is an end elevation of a device embodying the invention. Fig. 2 is a horizontal section of the device embodying the invention, taken on line 2—2 of Fig. 1, viewed as indicated by arrows. And Fig. 3 is a vertical section of said device, taken on line 3—3 of Fig. 1, viewed as indicated by arrows, showing in side elevation an electric motor and in vertical section the base on which said motor is mounted.

A reference character applied to indicate a given part indicates said part throughout the several figures of the drawings wherever the same appears.

1 represents the housing of the speed reducing mechanism of the device and 2 a cap to said housing. 3 represent lugs on housing 1, and 4 bolts to secure cap 2 in place on the housing. 5 represent lugs on one side of housing 1, adjacent to the lower end thereof. 6 represents the base on which the electric motor driving the speed reducing mechanism is adjustably mounted. $6^a$ represents a horizontal table on base 6. One end of the base is provided with lugs which are machined on face 7 thereof; and lugs 5 fit closely to said face. Housing 1 is rigidly secured to base 6 by bolts 8 and nuts 9. 10 represent feet on housing 1 and 11 apertures in said feet. 12 represent feet on base 6, which are also provided with apertures. Lag screws or bolts are designed to be extended through apertures 11 and the corresponding apertures in feet 12, to secure the device in place. 13 represent bolts which extend through screw threaded apertures in table $6^a$. $13^a$ represent bolts. 14 represents a spacing plate. $14^a$ represents the base of electric motor 15. Bolts $13^a$ extend through base $14^a$, plate 14, and into screw threaded holes in the bolts 13. 16 represent heads of bolts 13 and 17 set nuts on said bolts. Vertical adjustment of motor 15 is obtained by means of bolts 13 and is maintained by set nuts 17. 19 represents a collar which is forced on shaft 18, or made integral therewith. I have heretofore made collar 19 separate from said shaft and forced it thereon. 20 represents a cap which is secured on one side of housing 1, as by bolts 21. 22 represents an oil chamber or space in cap 20, and 23, 24, respectively, represent apertures through said cap through which shaft 18 extends. The aperture 23 is of larger diameter than is shaft 18, and aperture 24 is of larger diameter than is collar 19. 25 represents a duct in cap 20, which communicates with space or chamber 22, and with housing 1, to drain said space or chamber of any oil contained therein, and discharge it into the housing. 26, 27, respectively, represent journal bearings mounted in the sides of housing 1. 28 represents a shaft which is rotatably mounted in bearings 26, 27. 29, Fig. 1, represents a set screw by means of which the journal bearing 26 is maintained in an adjusted position. A similar set screw, not shown, is used to maintain bearing 27 in an adjusted position. 30, 31, respectively, represent a cap which is secured in the aperture in the side of housing 1 in which the journal bearings 26, 27 are mounted, to prevent oil contained in the housing from leaking or flowing therefrom. 32 represents a gear pinion on shaft 28, and is preferably integral with said shaft. 33, 34, respectively represent additional journal bearings mounted in the sides of housing 1, and 35 a shaft which is rotatably mounted in said bearings. 36, Fig. 1, represents a set screw to maintain bearing 33 in adjusted position. A similar set screw is used to maintain bearing 34 in adjusted position. 37, Fig. 3, represents a cap in the aperture in one side of housing 1, in which bearing 34 is mounted. 38 represents a gear wheel which is rigidly mounted on shaft 35, and is arranged to intermesh with gear pinion 32. 39 represents a sprocket wheel which is rigidly mounted on shaft 28, and 40 represents a sprocket wheel which is rigidly mounted on shaft 18 of motor 15. 41 represents a sprocket chain which connects sprocket wheels 39 and 40. 42 represents a duct to convey excess oil from journal bearing 33 back into housing 1.

The vertical adjustment of motor 15 which is provided by screws or bolts 13 and nuts 16, 17 is for means to take up any slack of chain 41 due to wear.

The collar 19, and chamber or space 22 is to prevent oil from moving along on shaft 18 out of housing 1, the chamber or space 22 being provided to receive any oil which may be thrown by centrifugal force from said shaft; from which chamber it will flow through duct 25 back into the housing.

I claim:

1. A housing for speed reducing mechanism provided with abutments on one side thereof adjacent to its lower end, and reducing mechanism in said housing, in combination with a hollow base adapted to support an electric motor, a motor on said base, provided with a shaft projecting into the housing, and operative connections between said shaft and said reducing mechanism, said base provided with abutments at one end arranged to co-act with said first named abutments, means to hold said abutments rigidly together, and means on said base to vertically adjust an electric motor and to maintain it in its adjusted position.

2. A housing for speed reducing mechanism provided with abutments on one side thereof adjacent to its lower end, speed reducing mechanism in said housing, in combination with a hollow base provided with abutments on one end arranged to co-act with said first named abutments, bolts and nuts arranged to hold said abutments rigidly together, and additional bolts and nuts arranged to adjustably support and continuously maintain an electric motor in adjusted position relative to said housing, said motor provided with a shaft projecting into said housing, and operative connections between said shaft and said speed reducing mechanism, whereby adjusted relative positions are maintained.

3. A housing for speed reducing mechanism and a base for an electric motor, means to rigidly join said housing and said base, said housing provided with an aperture through one of the side walls thereof, in combination with a shaft rotatably journalled in said housing, a sprocket wheel rigidly secured on said shaft, a driven shaft rotatable by said motor arranged to extend through said aperture, a sprocket wheel rigidly secured on said driven shaft, a sprocket chain arranged to connect said sprocket wheels, and means on said base to vertically adjust and maintain in adjusted position the motor having said driven shaft, whereby said sprocket chain may be adjusted and maintained in suitable relation to said sprocket wheels.

4. A housing for speed reducing mechanism provided with an aperture on one side thereof, a cap also provided with an aperture therethrough registering with said first named aperture, a shaft of an electric motor extending through said apertures, a collar on said shaft, said collar fitting loosely in said aperture in said cap, said cap having a space therein, said shaft fitting loosely in said aperture in said cap, and a duct communicating with said space and with the interior of said housing.

OTTO CULLMAN.